UNITED STATES PATENT OFFICE.

CHARLES A. BUTT, OF ATLANTA, GEORGIA.

METHOD OF CONDITIONING FERTILIZER.

1,418,618.      Specification of Letters Patent.      Patented June 6, 1922.

No Drawing.      Application filed June 17, 1921. Serial No. 478,284.

*To all whom it may concern:*

Be it known that I, CHARLES A. BUTT, a citizen of the United States, residing at Atlanta, in the county of Fulton and State of Georgia, have invented certain new and useful Improvements in Methods of Conditioning Fertilizer, of which the following is a specification.

This invention relates to a method of conditioning fertilizers, the method being designed for the purpose of producing a product in a substantially dry and pulverulent condition.

I have discovered that a fertilizer, fertilizer base, or material intended for use as a fertilizer which contains nitrogen as nitrates, nitrites, or in the form of nitric acid and nitrogen oxides, may be mixed with acid calcium phosphate or other acid compound, with a resulting product in dry condition, if a metal capable of generating hydrogen within the mixture be incorporated therein by simple mixing.

The method depends upon the production of nascent hydrogen by the action of the metal on the acid compound and the consequent reduction thereby of the free nitric acid or nitrogen oxides contained in the mixture. These reactions may be represented by the following equations, which, it is to be understood, are merely typical:

The method is equally applicable to the treatment of materials which contain some free nitric acid or nitrogen oxide and may be applied to the treatment of such materials with or without the addition thereto of acid calcium phosphate or other acid compound.

The ammonia produced by the reduction of the free nitric acid or nitrogen oxides combines with any free acid present, such as phosphoric, sulphuric, or hydrochloric, according to the following equations:

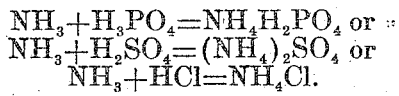

I have found that iron in the form of turnings, dust, filings, or in other fine or granular form, is a suitable metal to be incorporated in the fertilizer mixture, but zinc, aluminum and copper, or material containing these metals, or alloys thereof, may be used with equally as good results.

The proportion of metal required is governed by the amount of free nitric acid or nitrogen oxides in the material to be mixed, or the amount of free nitric acid or nitrogen oxides formed upon making a mixture of material containing these compounds in combined form with acid phosphate or other acid compound. The amount of metal however beyond that which is required to produce hydrogen sufficient to reduce all the nitric acid or nitrogen oxides may be in large excess without any serious consequence, in so far as the mechanical condition of the mixture is concerned.

The theoretical amount of metal to be used with a given material may be estimated from the equation stated above,

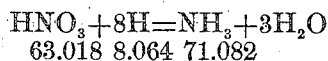

One part $HNO_3$ therefore requires an addition of metal capable of producing .128 parts by weight of hydrogen. Taking iron as an example, and assuming that the material or mixture contains 50 lbs. of free $HNO_3$ and also sufficient acid, phosphoric acid, for example, to neutralize the ammonia equivalent of the nitirc acid or nitrogen oxides present, the following equation will show the amount of iron necessary to complete the reaction,

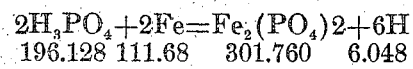

One pound of iron will therefore produce .0541 lbs. hydrogen. Since 1 lb. $HNO_3$ requires .128 lbs. hydrogen, it follows that 50 lbs. $HNO_3$ would require 6.4 lbs. Since 1 lb. iron produces .0541 lb. hydrogen, it would require 118 lbs. to produce 6.4 lbs.

It is to be understood that the above reactions are merely typical, and do not represent truly just what takes place in such complicated mixtures as are met with in some fertilizers.

The method which constitutes my invention is particularly adapted to the mixing of ammonium, sodium or potassium nitrates, or other materials containing nitrogen in mineral form of combination, either with the metal alone where the material contains free acid or with the metal and acid phosphate or acid sodium sulphate, or other acid compounds. In addition compounds carrying chlorine may be added to the mixture; in which case the ammonia formed by the reduction of the nitric acid or nitrogen oxides will neutralize the free hydrochloric acid formed by the action of the acid compound on the compounds carrying chlorine. However, the method is well adapted to the treatment of organic nitrates, such as obsolete or waste explosives, etc. To indicate the wide applicability of the method, I may mention the fact that there was recently offered to the fertilizer companies a waste material containing potassium nitrate in addition to calcium chloride and organic nitrates, the material therefor being hygroscopic and for this reason not desirable as a fertilizer. Under treatment of this waste material with iron turnings together with acid phosphate, by simply mixing the three ingredients together, there was obtained a product that remained dry in the atmosphere and did not cake hard in dry weather as did the waste material alone.

My method obviates the necessity of using other conditioners, such as hydrated lime or limestone, in fertilizers in order to neutralize free acid and has several advantages over methods employing these materials, in that free nitric acid and nitrogen oxides are destroyed, calcium is not added (as in the case of lime), thereby permitting the use in greater quantities of other fertilizer materials carrying potassium or sodium carbonate without as great a tendency to cause reversion of the phosphoric acid to insoluble form.

Organic materials such as cotton seed meal, castor, soya, velvet and other like meals, tankage and other nitrogenous materials may be incorporated in mixtures conditioned by my method with a greatly reduced fire hazard, due to the reduction of free nitric acid and nitrogen oxides; and for the same reason the bags or other containers are not attacked and the original odor of such meals, etc., are preserved in the mixture.

I claim:

1. The method of treating fertilizer, which consists in generating nascent hydrogen in fertilizer material containing a nitrogen compound capable of reacting with nascent hydrogen to produce ammonia, whereby the ammonia will combine with any free acid in the material.

2. The method of producing a substantially non-hygroscopic fertilizer, which consists in generating nascent hydrogen in a fertilizer material containing nitric acid, whereby the ammonia produced by the action of the nascent hydrogen on the nitric acid combines with any free acid in the material.

3. The method of producing a substantially non-hygroscopic fertilizer, which consists in generating hydrogen by incorporating iron particles in fertilizer material containing free acid and nitrogen compounds capable of reacting with nascent hydrogen to form ammonia.

4. The method of producing a substantially non-hygroscopic fertilizer, which consists in generating hydrogen by incorporating iron particles in fertilizer material containing acid calcium phosphate and nitrogen compounds capable of reacting with nascent hydrogen to form ammonia.

In testimony whereof I hereunto affix my signature.

CHARLES A. BUTT.